(12) United States Patent
Davidson et al.

(10) Patent No.: US 6,483,820 B1
(45) Date of Patent: Nov. 19, 2002

(54) SYSTEM AND METHOD FOR DYNAMIC RADIO RESOURCE ALLOCATION FOR NON-TRANSPARENT HIGH-SPEED CIRCUIT-SWITCHED DATA SERVICES

(75) Inventors: Lee Davidson, McKinney, TX (US); Heino Hameleers, Kerkrade (NL); Frank Hundscheidt, Kerkrade (NL)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/274,440

(22) Filed: Mar. 22, 1999

(51) Int. Cl.[7] .................................................. H04Q 7/20
(52) U.S. Cl. ...................... 370/329; 370/429; 370/468; 455/452
(58) Field of Search ................................. 370/352, 468, 370/477, 412, 413, 338, 328, 329, 401, 402, 429; 455/452, 453, 557, 403

(56) References Cited

U.S. PATENT DOCUMENTS

| | | | | |
|---|---|---|---|---|
| 5,608,727 A | * | 3/1997 | Perreault et al. | 370/462 |
| 5,751,741 A | * | 5/1998 | Voith et al. | 370/914 |
| 5,838,681 A | * | 11/1998 | Bonomi et al. | 370/395.41 |
| 6,118,834 A | * | 9/2000 | Rasanen | 370/231 |
| 6,201,976 B1 | * | 3/2001 | Rasanen | 370/209 |
| 6,311,055 B1 | * | 10/2001 | Boltz | 379/196 |
| 6,347,091 B1 | * | 2/2002 | Wallentin et al. | 370/235 |

* cited by examiner

*Primary Examiner*—Nay Maung
*Assistant Examiner*—Sonny Trinh
(74) *Attorney, Agent, or Firm*—Jenkens & Gilchrist, P.C.

(57) ABSTRACT

A system and method for providing dynamic demand based management of traffic channel allocation in a mobile communications network providing high-speed circuit-switched data services. Traffic channel allocation for the data services is controlled dynamically by an InterWorking Function (IWF) which monitors the status of the associated buffers. The need for additional radio resources and the under-utilization of current radio resources is automatically detected by the IWF which respectively responds by initiating new traffic channel assignments via the Mobile Services switching Center or requesting the Mobile Services switching center deallocate an appropriate portion of the allocated radio spectrum.

19 Claims, 4 Drawing Sheets

SYSTEM AND METHOD FOR DYNAMIC RADIO RESOURCE ALLOCATION FOR NON-TRANSPARENT HIGH-SPEED CIRCUIT-SWITCHED DATA SERVICES

BACKGROUND OF THE INVENTION

1. Technical Field of the Invention

The present invention relates to the mobile communications field and, in particular, to a system and method for efficient radio resource allocation for high speed circuit switched data services over mobile communications network.

2. Description of Related Art

The provision of data services in a mobile environment is recently finding greater demand. Data services are herein defined as bearer services and, more particularly, as the service bearer's ability to provide internetworking between a wireless network, e.g. the Global System for Mobile Communications (GSM), and a fixed network. GSM was designed to provide basic data services, e.g. facsimile, data circuit asynchronous services, data circuit synchronous services, unrestricted digital information towards ISDN, and alternate speech/FAX. To provide these services within the GSM Public Land Mobile Network (PLMN) and between the GSM network and other external networks, it is necessary to establish InterWorking Functions (IWF), which are essentially a gateway between the fixed and wireless network. In GSM, the Radio Link Protocol (RLP) was defined for this specific intention of protecting data across the radio path. However, the low bandwidth of the radio channels provides for a maximum transmission rate of only 9600 bit/s per channel.

In order to provide more bandwidth demanding services, e.g. Internet access, in a mobile environment with reasonable performance, high-speed circuit-switched data services have been developed that can provide data transfers over multiple traffic channels in parallel. Tariffs are accordingly imposed based on the number of traffic channels used during the call. In such an arrangement, a fair imposition of tariffs is problematic when data transfers are bursty in nature as is the inherent nature of Internet access and, in general, packet data services.

When data transfers occur in bursts, the data transfer rate is not constant and likely changes continually, and often dramatically, during the span of the call. Consequently, dedicated traffic channels are not used optimally. For example, if the data transfer rate is lower than the capacity of the traffic channels, the traffic channel resources are wasted proportionately to the channel capacity and data transfer differential. Conversely, if the data transfer rate is greater than the capacity of the traffic channels allocated for the transfer, the data transfer on the network side of the IWF will have to be stopped while the transfer on the mobile side continues to process the data, thereby increasing the time required to transfer the data respective to the time required to transfer the data on a greater number of channels.

Another problem, in networks providing high-speed circuit-switched data services is encountered when calls use autobauding. In this scenario, the subscriber is able to set the maximum data transfer rate by selecting, during call setup, a certain number of traffic channels to be used for the data transfer. The subscriber does so, however, with no knowledge of the data transfer rate that will be obtained on each channel since autobauding is used in the call set up. Thus, if the subscriber chooses an air interface configuration that does not provide sufficient capacity for the rate selected as a result of the autobauding, the data transfer will not take place at the highest possible rate. Conversely, if the subscriber chooses an air interface configuration that provides a higher capacity than needed for the rate selected at autobauding, excessive capacity will be allocated for the call resulting in the subscriber paying a tariff greater than needed for the call performance provided.

In GSM, the User Initiated Service Level Up and Downgrading (USLUD) procedure is defined to address the above-mentioned complications of implementing high-speed circuit-switched data services in a mobile environment. The USLUD provides the mobile terminal with the capability to request an increase or decrease of the air interface bandwidth. However, the USLUD procedure is unable to be implemented when the air interface bandwidth is too low since the mobile terminal cannot tell it is too low. Also, the mobile terminal does not have control over the air interface resources. Every request to increase or decrease the air interface bandwidth requires additional signaling between the mobile terminal and the Mobile Services Switching Centre which leads to a high signaling load when the frequency of requests is high.

It is, therefore, a first object of the present invention to provide an improved system and method for allocating bandwidth in a mobile communications network.

It is another object of the present invention to provide for improved system resource allocation in a mobile communications network providing data services.

It is yet another object of the present invention to provide more efficient channel utilization in a mobile communications network providing high-speed circuit-switched data services.

It is still another object of the present invention to provide dynamic management of high-speed circuit-switched data service channels in a mobile communications network.

It is still another object of the present invention to provide channel allocation in a manner which results in optimal resource utilization in a mobile communications network providing high-speed circuit-switched data services.

It is still another object of the present invention to provide a dynamic management of high-speed circuit-switched data service channel allocation that automatically averts allocation of channel bandwidth resulting in subscriber over or under-utilization of the allocated bandwidth.

SUMMARY OF THE INVENTION

The present invention is directed to a system and method for providing dynamic demand based management of traffic channel allocation in a mobile communications network providing high-speed circuit-switched data services. Traffic channel allocation for the data services is controlled dynamically by an IWF which monitors the status of associated buffers. The need for additional radio resources and the under-utilization of current radio resources is automatically detected by the IWF which respectively responds by initiating new traffic channel assignments via the Mobile Services switching Center or requesting that the Mobile Services switching center deallocate an appropriate portion of the allocated radio spectrum.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be through and complete, and will fully convey the scope of the invention to those skilled in the art.

Figure 1:
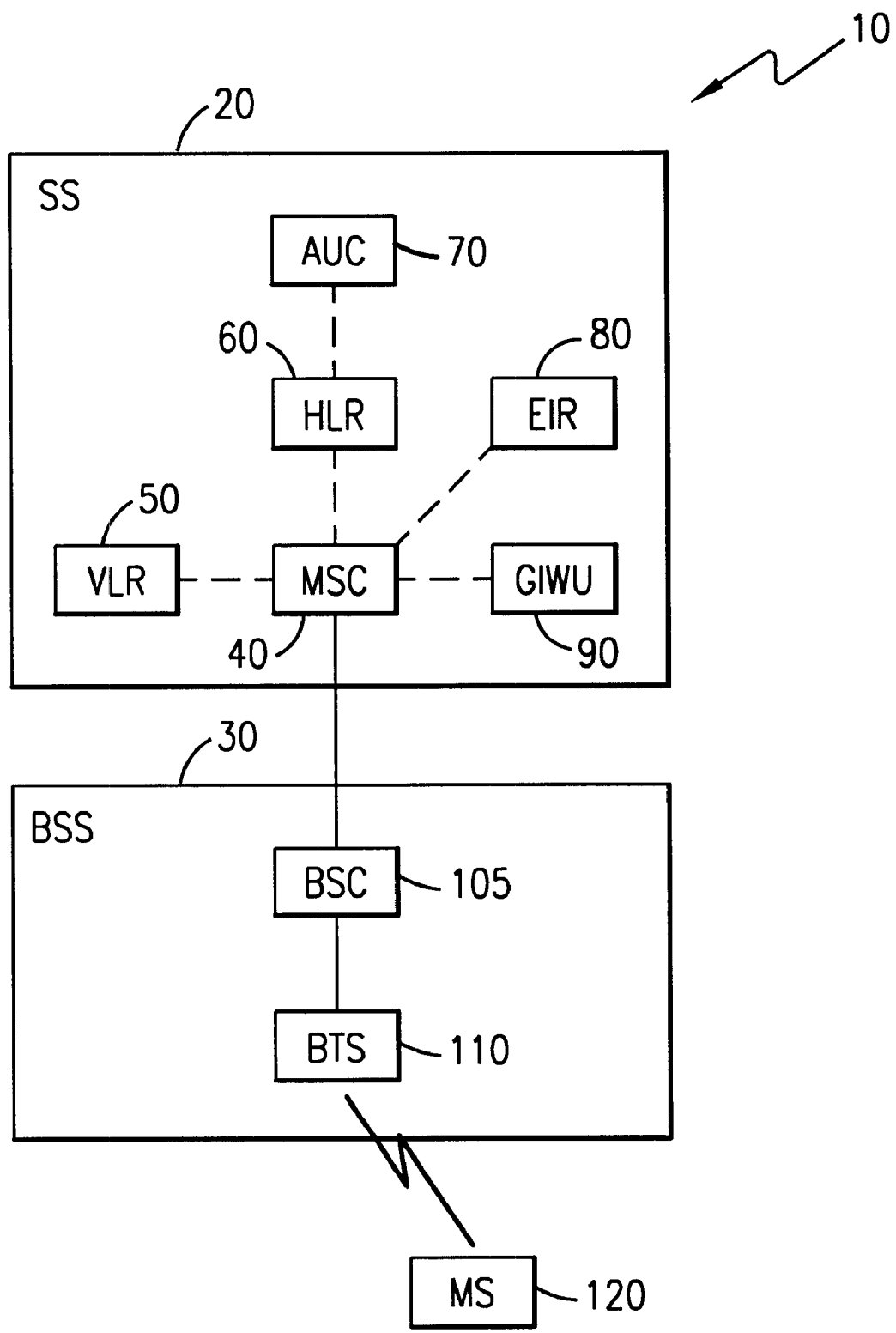
FIG. 1 is an exemplary telecommunications network Switching System and Base Station System on which the present invention may be applied.

In FIG. 1 is shown a simplified telecommunications system, designated by reference numeral 10, on which the present invention may be applied. Telecommunication system 10 is, in general, divided into a Switching System (SS) 20 and a Base Station System (BSS) 30. Each of the SS 20 and BSS 30 contain a number of functional units implemented in various hardware and the functionality of each are well understood by those skilled in the art. Specifically, the Switching System 20 contains a Mobile services Switching Center (MSC) 40, a Visitor Location Register (VLR) 50, a Home Location Register (HLR) 60, an Authentication Center 70, an Equipment Identity Register (EIR) 80, and a GSM InterWorking Unit (GIWU) 90. It should be understood that the GIWU may be standalone (shared by one or more MSCs) or internal to an MSC. The BSS 30 contains a Base Station Controller (BSC) 105 in communication with and in control of a plurality of Base Transceiver Stations (BTSs) 110, only one of which is shown for simplicity of discussion. Each individual BTS of a group of BTSs 110 under the control of a given BSC, such as BSC 105, define a radio cell operating on a set of radio channels, thereby providing service to a plurality of Mobile Stations (MSs) 120, again only one of which is illustrated. Although the specific network architecture and nomenclature are depicted and described according to the GSM configuration illustrated in FIG. 1, it is understood that this is done so for illustrative purposes only and that the network architecture on which the present invention may be applied is not limited to GSM but may be equivalently implemented on any other digital mobile communications system, e.g. D-AMPS, TDMA-based satellite systems, PDC, etc.

The GIWU 90 is included in telecommunications system 10 for providing data services, e.g., facsimile, data circuit asynchronous services, data circuit synchronous services, unrestricted digital information towards ISDN, alternate speech/FAX, data rate adaption, to MSs 120. To provide these services within the GSM PLMN and between the GSM PLMN and other external networks, it is necessary to establish IWFs. These IWFs are typically implemented in the SS 20 as a combination of several subsystems. The subsystems of a given SS 20 that deal specifically with the traffic portion of the IWF is the GIWU 90, and contain various hardware and software units. The most common functions of the GIWU 90 are providing modem and FAX adapter pools and providing rate adaption. Although connections in GSM are circuit-switched, packet services, e.g., Internet access, are not precluded from a system that is otherwise considered circuit-switched. In order to access a packet switched public data network (PSPDN), a connection to a Packet Assembly Disassembly (PAD) unit is made to transform the bit stream from an asynchronous terminal to data packets in conjunction with performance of the required service by the GIWU 90.

Figure 2:
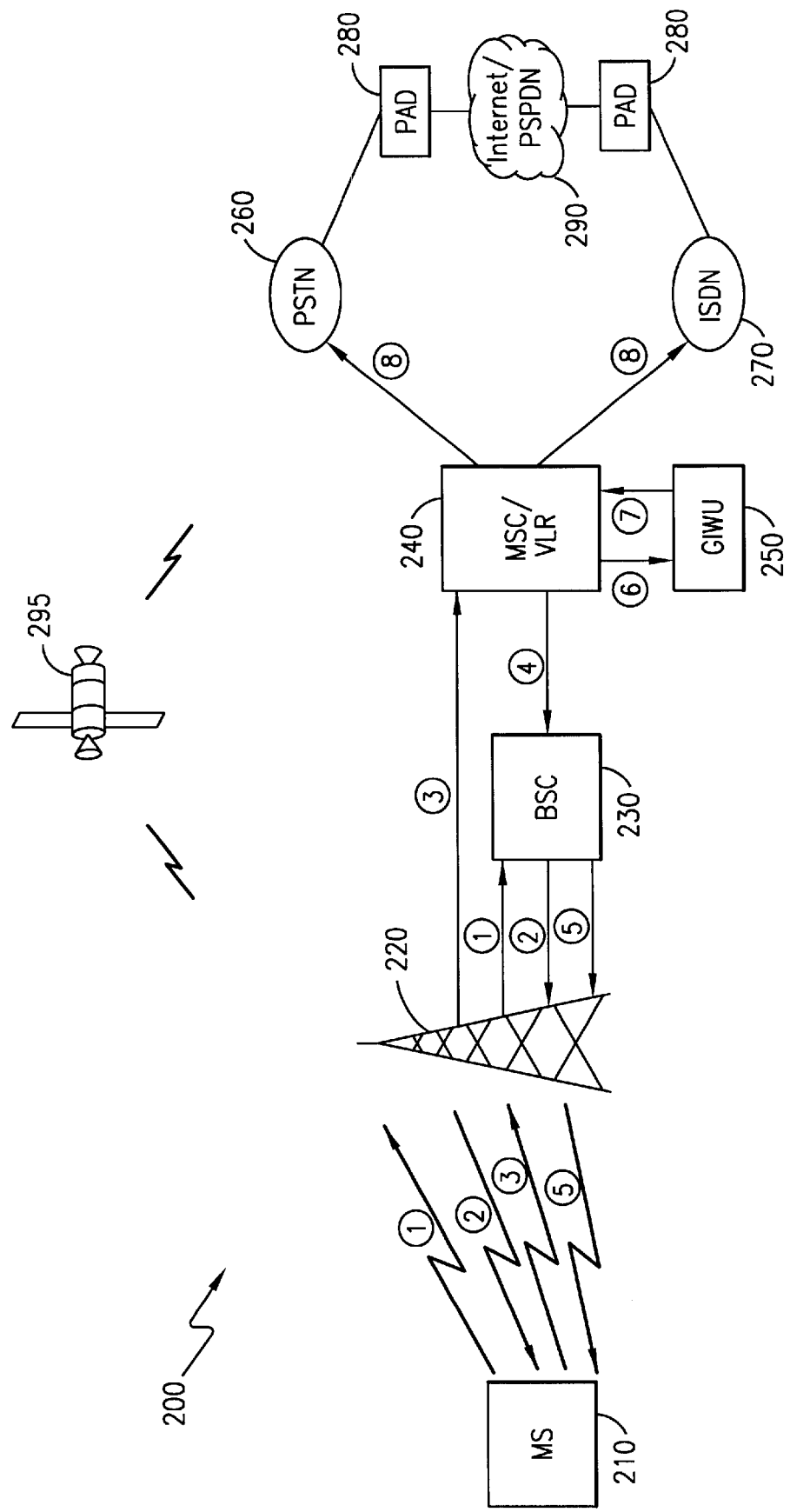
FIG. 2 is exemplary telecommunications network for providing high speed circuit switched data services on which the present invention may improve upon.

In FIG. 2 is shown a telecommunications system 200 on which mobile data services may be provided and on which the present invention may be applied. A data call may be initiated by an MS 210 requesting a signaling channel from a BTS 220 (and a corresponding BSC 230) by procedures substantially identical to voice call setup procedures (indicated in FIG. 2 as circled step 1). The BSC 230 responds by allocating a signaling channel (step 2), over which the MS 210 transmits the call request to an MSC/VLR 240 (step 3). Reception of the call request by the MSC/VLR 240 includes a number of activities well understood by those skilled in the art, including authentication procedures with the AUC 70 shown in FIG. 1 and editing a record corresponding to that MS 210 in the VLR 50 to denote a busy status. In the case of a data call, data referred to as bearer capability will be included in the call setup message. Bearer capability describes the type of bearer service, e.g., facsimile, and data, and the rate of transmission requested by the MS 210. The MSC/VLR 240 then transmits a request to the BSC 230 to allocate a free traffic channel (step 4), whereupon the BTS 220 and the MS 210 are instructed to activate the allocated traffic channel (step 5).

The MSC/VLR 240 next analyzes the bearer capability data transmitted in the call request number, along with the destination number, and forwards this information to a GIWU 250 (step 6). It should be understood that the GIWU 250, illustrated in FIG. 3 as external to the MSC/VLR 240, may in preferred embodiments instead reside inside the MSC/VLR 240. The GIWU 250 is then configured to perform the required service, e.g., rate adaption, facsimile, data, etc. The call is then rerouted to the MSC/VLR 240 (step 7); and then directed to the appropriate external network (step 8), e.g., a Public Switched Telephone Network (PSTN) 260, an Integrated Services Digital Network .(ISDN) 270 or other external telephony or data network. Further processing of the data stream may occur once the call is routed to an external network. For example, if the data call is intended for X.25 communications, the call would be directed through a Packet Assembly/Disassembly (PAD) 280 unit for bit stream transformation to packet data pursuant to conditioning the original asynchronous data for conformity in the targeted packet switched public data network (PSPDN) 290. Similarly, if the data call is intended for Internet communications, the call would be directed through an Internet Access Server (280) for bit stream transformation to packet data pursuant to conditioning the original asynchronous data for conformity in the targeted Internet (290), as is understood in the art.

As is common in communication systems, buffers are used extensively for providing compatibility between disparate communication units. It should be understood that data buffers are almost necessarily utilized in the communication system as described in FIG. 2 for enabling seamless communications between inherently different devices demonstrating different transmission rates and/or protocols, e.g., the asynchronous MS 210 communicating with the Internet/

PSPDN 290. This is particularly true when high-speed circuit-switched data services are provided for in a network similar to that in the aforedescribed figures since the number of traffic channels and the corresponding bandwidth may change remarkably at any given moment. Delivery of such services naturally exacerbates the typical differential in data received from the terminal equipment and the data transmitted to the network side encountered at MSC/VLR 240.

Pursuant to the innovative teachings of the present invention, high-speed circuit-switched data services may be provided for in the telecommunications system 200 without major modification to the system architecture. These services can be supplied by providing the MSC/VLR 240 and BSC 230 with logical functionality capable of directing the respective BTS 220 to allocate a plurality of channels to a single MS 210, thereby allowing parallel data transfers. It should be understood that when referring to an allocation of a plurality of channels, the term "channels" describes a number of physical channels on a single carrier frequency, e.g., a plurality of time slots in a frame, as is well understood in time division multiple access (TDMA) communications. Similar to the above description pertaining chiefly to terrestrial systems, it should be understood that the system and method of the present invention are also applicable to a satellite (295) in systems that have narrower RF carriers and use multiple RF carriers accordingly.

However, providing multiple channels complicates fair tariff implementation to the subscriber utilizing these services since efficient utilization of the radio resources is complicated by execution of these services. For example, many data calls, most notably Internet access, are characterized by data transfers that are bursty in nature. Consequently, the data transfer rate will not be constant over the span of the call but may in fact change continually. If the data transfer rate is lower than the capacity of the traffic channel or channels allocated, the designated channel or channels are underutilized and the subscriber is likely charged for the appropriated channels regardless of whether or not the channels were efficiently utilized. If the data transfer on the external network side is greater than the capacity of the traffic channels allocated, the data transfer on the external network side will eventually have to be stopped until sufficient buffer capacity is obtained, thus delaying the completion of the data transfer relative to a similar transfer with a greater number of channels assigned. The aforementioned USLUD, as defined in GSM, has attempted to address this problem but suffers a number of inefficiencies, as described hereinabove.

In a preferred embodiment of the present invention, more efficient utilization of the radio resources may be had by implementing a dynamic, demand-based management of HSCSD traffic channel allocation. An IWF is executed that monitors the status of the buffers in the GIWU. If the IWF detects the need for additional radio resources, i.e., the network data transfer exceeds the terminal traffic channel capacity, the MSC/VLR 240 is instructed to assign an additional channel(s). Likewise, if the IWF detects that the previously allocated radio resources are underutilized, the MSC can be instructed to release a channel(s).

Figure 3:
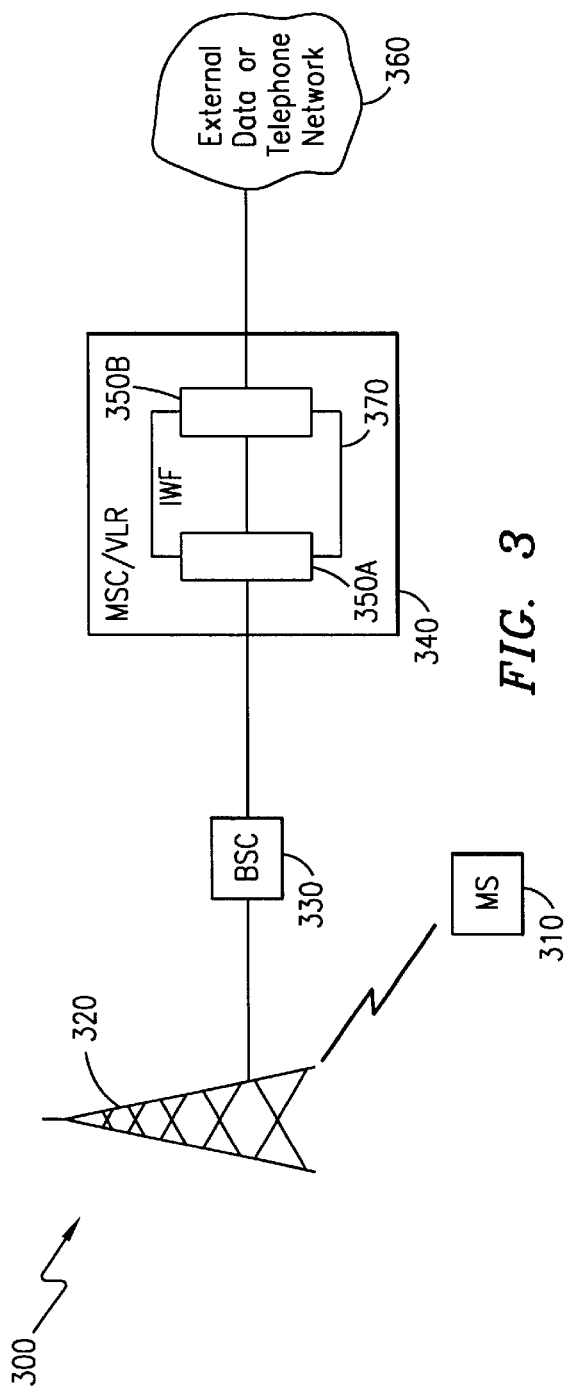
FIG. 3 is an illustrative telecommunications system providing high speed circuit switched data services as taught by the present invention.

A more complete understanding of the present invention may be had with reference now to FIG. 3 which depicts an MSC/VLR 340 controlled radio resource allocation for HSCSD, as embodied in a telecommunications system generally designated by reference numeral 300. An MS 310 requests HSCSD services in a substantially similar manner to a data service request as aforedescribed with reference to FIG. 2. Once the MSC/VLR 340 receives a call request from the MS 310, the bearer capability and destination number are analyzed and forwarded to a GIWU 370 resident within the MSC/VLR 340. The GIWU 370 is then configured to provide the requested service, including execution of an IWF for data call management and status monitoring of a first and second buffer, 350A and 350B, respectively. Once configured, the GIWU 370 reroutes the call back to the MSC/VLR 340 where it is routed to the proper destination, e.g., an external data or telephony network 360. Throughout the call, the GIWU 370 monitors the buffers 350A and 350B associated with the particular data call being serviced.

Figure 4:
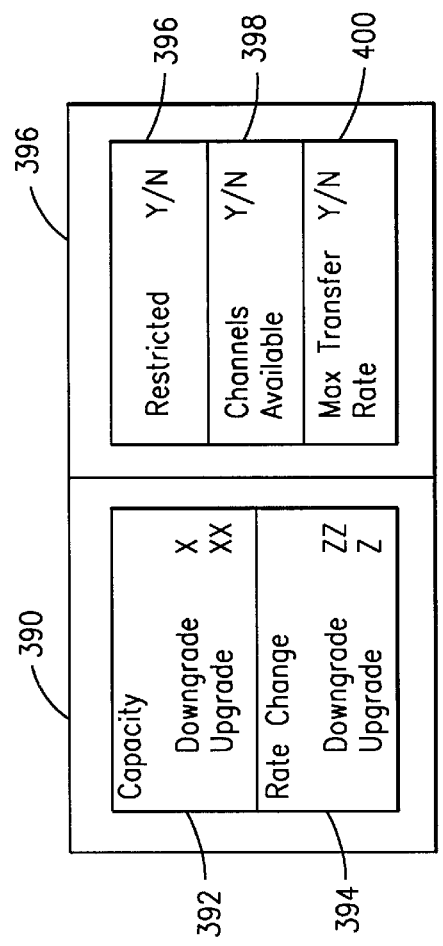
FIG. 4 illustrates thresholds and status flags associated with buffers utilized in the system shown in FIG. 3.

Associated with buffers 350A and 350B are, in a preferred embodiment, a plurality of network operator definable thresholds 390 and status flags 391, as illustrated in more detail in FIG. 4. These thresholds are, respectively, a buffer capacity threshold 392 and a buffer capacity rate change threshold 394. The status flags include a resource restriction flag 396, a traffic channel availability flag 398 and a maximum transfer rate flag 400, respectively. Buffer capacity threshold 392 can, for example, be set to declare an upgrade capacity XX associated with buffers 350A and 350B, e.g., a percentage available of the maximum capacity or a numerical representation of the bytes available in one or both of the buffers, that when reached will prompt the GIWU 370 to request the MSC/VLR 340 to allocate an additional channel for the MS 310.

Similarly, the buffer capacity rate change threshold 394 can be set to declare a rate of change, e.g., bytes/unit-time increase Z, that when reached in one or both of the buffers 350A and 350B will prompt the GIWU 370 to request the MSC/VLR 340 to allocate an additional traffic channel for the MS 310. Allocation of a single traffic channel resulting from either condition described is defined as a slow-upgrade and may be preemptively blocked by any of the following conditions: resource restriction flag 396 having a value of Yes (Y); the traffic channel availability flag 398 having a value of No (N); or the maximum transfer rate flag having a value of N.

Regarding the status flags, a resource restriction flag 396 value of Y indicates a restriction on upgrading due to a lack of radio resources. This flag can be set to Y when the MSC/VLR 340 determines that the serving BTS 320 is operating at a given capacity, such that assigning more traffic channels to the MS 310 may result in performance loss of the system, e.g., blocking of other MSs from access, etc. A traffic channel availability flag 398 value of N indicates that the MS 310 is already operating at the maximum allowable number of channels, e.g., the maximum number of channels that this particular MS 310 subscriber has agreed to pay for. The maximum transfer rate flag indicates whether or not the currently allocated channel or channels are currently transmitting data at the maximum rate per channel, e.g., 9600 kbps/channel in GSM. This flag, therefore, functions to block allocation of additional channels when the currently allocated channels still have unused capacity.

Buffer capacity threshold 392 can also be set to declare a downgrade capacity value X of one or both of buffers 350A and 350B, e.g., a percentage available of the maximum capacity or a numerical representation of the bytes available, that when the amount of data in the buffers falls below the specified capacity X, the GIWU (or other IWF device) 370 will request the MSC/VLR 340 to deallocate a channel from the MS 310. Slow downgrading, or the deallocation of a single traffic channel, may be executed in this event. A downgrade could alternatively be defined to occur only when one or both of the buffers 350A and 350B becomes completely empty.

In a second embodiment of the present invention, fast upgrading and downgrading may be performed as an alternative to the aforedescribed slow upgrading and downgrading. In this embodiment, an upgrade directly to the upper bound of allowed channel allocation is made whenever an upgrade execution is made. This upgrade will be made to the maximum number of channels allowed allocated to a single MS 310, e.g., 4 in GSM at present, or the maximum channels agreed upon by the MS 310 subscriber (who picks the maximum on a pre-call basis), whichever is lower. Whenever a downgrade is executed when the HSCSD is operating in fast upgrade and downgrade mode, the traffic channels allocated to the MS 310 are immediately downgraded to a single channel. Evaluation of a fast upgrade or downgrade is made in a manner substantially identical to that described above in connection with a slow upgrade or downgrade.

A third embodiment of the present invention may be realized by providing channel upgrading and downgrading dependent on the magnitude of data rate changes in the buffers 350A and 350B, i.e., the number of channels to be allocated or deallocated is dependent upon the respective rate of increase or decrease of data in the buffers. The IWF 370 will measure the amount of data in the buffers 350A and 350B at fixed intervals of time. The difference between two consecutive measurements can then be compared to an upgrade threshold value ZZ and a downgrade threshold value Z in the buffer capacity rate change threshold 394 to evaluate whether an upgrade or downgrade should be implemented. Instead of upgrading or downgrading a single channel, as is performed when operating in slow upgrade and downgrade mode, or upgrading and downgrading to the respective upper or lower limit of channel allocation, as is performed in the fast upgrade and downgrade mode, the number of channel allocations can instead be made based on the actual magnitude of the difference in the quantity of data measured in the buffers 350A and 350B. Various first and/or second order curves may be formulated and reduced to table look-ups to expedite this algorithm execution, as is well known in the art.

Figure 5A:
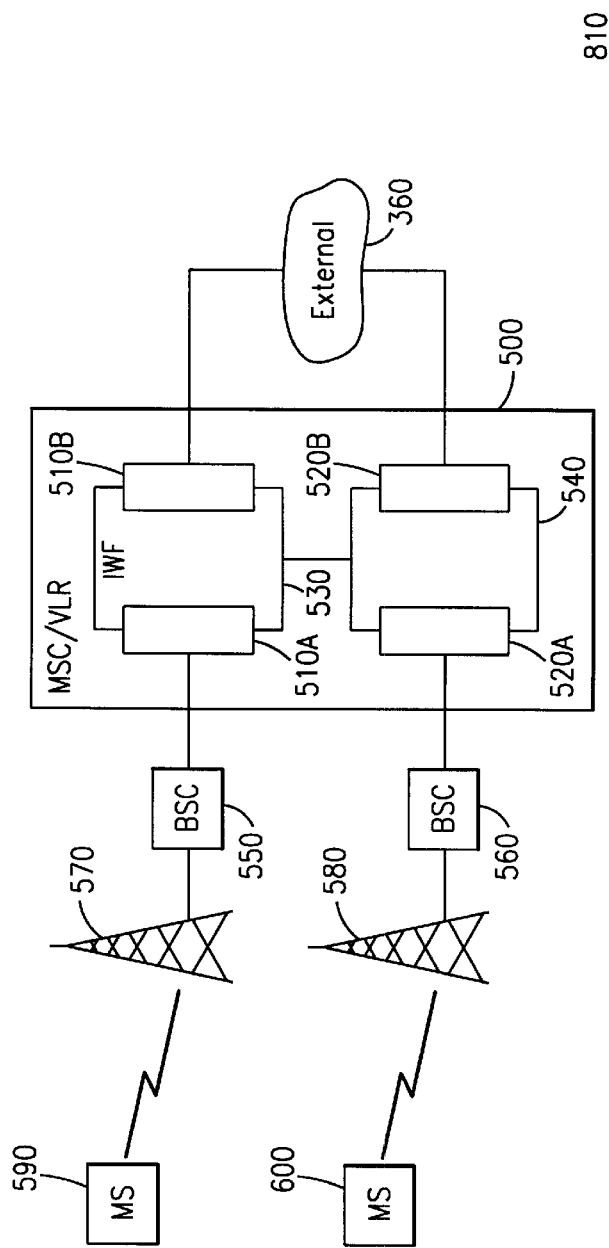
FIGS. 5A–5B illustrate modified configurations of a preferred embodiment of the present invention.

Although the above described embodiments and associated figures have all represented a mobile station-originated call with destinations in an external wired data or telephony network, it should be understood that this is for illustrative purposes only. The configurations as depicted and described could as effectively have been represented-in the reverse direction, i.e., an external network call terminated at a mobile station, with no change in the general telecommunications system 300. Furthermore, the call origination and termination may be placed within the same network. With reference now to FIG. 5A, there is illustrated a simplified configuration of the present invention as embodied in a mobile originated-mobile destined HSCSD services call. This particular depiction represents an intra-system call as both an originating MS 590 and a destination MS 600 are being serviced by the same MSC/VLR 500 controlling the respective servicing BSCs 550 and 560. As illustrated, MSC/VLR 500 may provide each participating MS 550 and 560 with corresponding buffers 510 and 520, each buffer having respective IWFs 530 and 540 associated therewith.

Figure 5B:
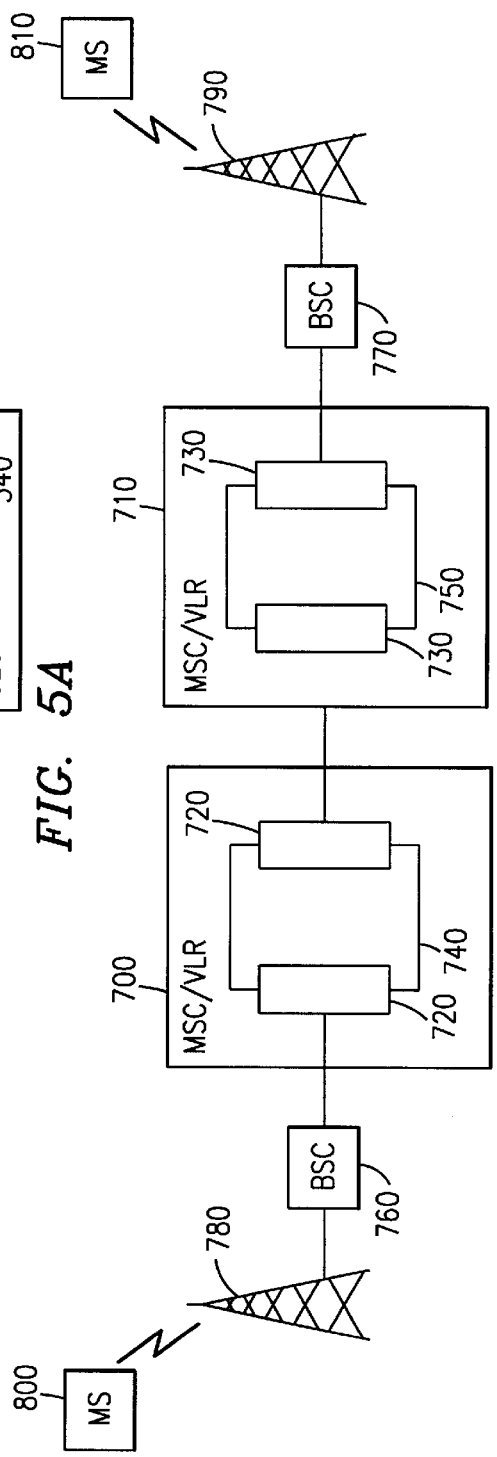

In FIG. 5B is illustrated a simplified configuration of the present invention as embodied in a mobile originated-mobile destined HSCSD services call with both an originating MS 800 and a terminating MS 810 being serviced by separate respective BSCs 760 and 770, each of BSCs 760 and 770 operating under the corresponding control of MSC/VLRs 700 and 710. In servicing such a call, each of MSC/VLRs 700 and 710 maintain respective buffers 720 and 730, each buffer having respective IWFs 740 and 750 associated therewith. It should be clear that these embodiments are simply illustrative and not exhaustive of the numerous configurations capable of being achieved by practice of the present invention.

It should also be understood that the buffers may be allocated per direction and not necessarily per side of the call, i.e., resources may be restricted in one direction, e.g., from the MS to the MSC or vice versa.

Although preferred embodiments of the system and method of the present invention has been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A telecommunication system managing resource allocation between a mobile station and a terminal device, said telecommunication system comprising:

a mobile services switching center in communication with said mobile station, said mobile services switching center allocating at least one channel for communication by said mobile station to mobile services switching center, said mobile services switching center being also in communication with said terminal device;

a first buffer, connected to said mobile services switching center, for buffering data communications to and from said mobile station;

a second buffer, connected to said mobile services switching center, for buffering said data communications to and from said terminal device; and interworking function means, connected to said first and second buffers, for detecting utilization of said at least one channel and said first and second buffers, and, in response to a change in said utilization, allocating at least one additional channel between said mobile station and said mobile services switching center, wherein allocation of said at least one additional channel allows for parallel transmission of said data communications.

2. The telecommunications system according to claim 1, wherein said interworking function allocates said at least one additional channel when said interworking function means detects under-utilization of at least one of said first and second buffers.

3. The telecommunications system according to claim 1, wherein said interworking function deallocates said at least one additional channel when said interworking function means detects over-utilization of at least one of said first and second buffers.

4. The telecommunications system according to claim 1, wherein said at least one additional channel includes a plurality of additional channels.

5. The telecommunications system according to claim 4, wherein said interworking function means allocates at least one of said plurality of additional channels up to a predetermined maximum number of said plurality of additional channels between said mobile station and said mobile services switching center.

6. The telecommunications system according to claim 5, wherein said interworking function means deallocates at least one of said plurality of additional channels down to a predetermined minimum number of said plurality of additional channels between said mobile station and said mobile services switching center.

7. The telecommunications system according to claim 6, wherein said predetermined minimum number is one.

8. The telecommunications system according to claim 1, wherein said interworking function means allocates said at least one additional channel between said mobile station and mobile services switching center pursuant to a condition flags.

9. The telecommunications system according to claim 8; wherein said interworking function means allocates said condition flag being selected from the group consisting of a resource restriction flag, a traffic channel availability flag and a maximum transfer rate flag.

10. The telecommunications system according to claim 1, wherein said interworking function means allocates said at least one additional channel between said mobile station and mobile services switching center pursuant to a threshold.

11. The telecommunications system according to claim 10, wherein said threshold is selected from the group consisting of a buffer capacity threshold and a buffer capacity rate change threshold.

12. The telecommunications system according to claim 1, wherein said interworking function means allocates said at least one additional channel between said mobile station and said mobile services switching center pursuant to a difference measurement between said first and second buffers.

13. The telecommunications system according to claim 1, wherein said terminal device is the Internet.

14. The telecommunications system according to claim 1, wherein said terminal device is a packet switched public data network.

15. The telecommunications system according to claim. 1, wherein said interworking function means is a GSM Interworking Unit (GIWU).

16. The telecommunications system according to claim 15, wherein said first and second buffers are in said GIWU.

17. The telecommunications system according to claim 1, wherein said mobile station is in communication with said mobile station via a terrestrial link.

18. The telecommunications system according to claim 1, wherein said mobile station is in communication with said mobile services switching center via a satellite.

19. A method for managing resource allocation between a mobile station in a telecommunications system and an end user, said method comprising the steps of:

buffering, within a first buffer connected to a mobile services switching center in communication with said mobile station, data communications to and from said mobile station;

buffering, within a second buffer connected to said mobile services switching center, data communications to and from said end user, monitoring, by an interworking function device, utilization of said first and second buffers and at least one channel between said mobile station and said mobile services switching center;

detecting, by said interworking function device, a change in said utilization of said at least one channel; and allocating at least one additional channel between said mobile station and said mobile services switching center, wherein allocation of said at least one additional channel allows for parallel transmission of said data communications.

* * * * *